(12) United States Patent
Westley

(10) Patent No.: US 6,405,478 B1
(45) Date of Patent: Jun. 18, 2002

(54) BUOYANT FISHING APPARATUS

(76) Inventor: Jesse Westley, 80 Sweezy La., Middle Island, NY (US) 11953-1537

( * ) Notice: Subject to any disclaimer, the term of this patent is extended or adjusted under 35 U.S.C. 154(b) by 0 days.

(21) Appl. No.: 09/991,176

(22) Filed: Nov. 16, 2001

(51) Int. Cl.[7] ............................................. A01K 97/10
(52) U.S. Cl. ........................................................ 43/54.1
(58) Field of Search ................................ 43/21.2, 54.1; 52/528, 529, 534

(56) References Cited

U.S. PATENT DOCUMENTS

| | | | |
|---|---|---|---|
| 3,678,611 A | 7/1972 | Files | |
| 3,745,692 A | * 7/1973 | McGee | 43/21.2 |
| 4,638,593 A | 1/1987 | Garcia | |
| 4,763,435 A | * 8/1988 | Deering | 43/21.2 |
| 4,794,723 A | 1/1989 | Arnold et al. | |
| 4,878,311 A | * 11/1989 | Cano | 43/54.1 |
| D309,937 S | 8/1990 | Baxter | |
| 5,054,228 A | * 10/1991 | Elkins | 43/21.2 |
| 5,303,500 A | * 4/1994 | Luukonen | 43/54.1 |
| 5,402,596 A | * 4/1995 | Gillming, Jr. | 43/54.1 |
| 5,697,183 A | * 12/1997 | Walker | 43/21.2 |
| 5,724,764 A | * 3/1998 | Alsup | 43/54.1 |
| D409,268 S | 5/1999 | O'rourke | |
| 6,014,833 A | 1/2000 | Benavidez | |

* cited by examiner

Primary Examiner—Thomas Price

(57) ABSTRACT

A buoyant fishing apparatus for supporting fishing rods and accessories above a water level. The buoyant fishing apparatus includes a buoyant platform with an area for placing fishing accessories, a frame member coupled to the top surface, and a plurality of fishing rod holders.

6 Claims, 2 Drawing Sheets

BUOYANT FISHING APPARATUS

BACKGROUND OF THE INVENTION

1. Field of the Invention

The present invention relates to buoyant fishing apparatuses and more particularly pertains to a new buoyant fishing apparatus for supporting fishing rods and accessories above a water level.

2. Description of the Prior Art

The use of buoyant fishing apparatuses is known in the prior art. More specifically, buoyant fishing apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,638,593; U.S. Pat. No. Des. 309,937; U.S. Pat. No. Des. 409,268; U.S. Pat. No. 6,014,833; U.S. Pat. No. 5,402,596; U.S. Pat. No. 3,678,611; and U.S. Pat. No. 4,794,723.

While these devices fulfill their respective, particular objectives and requirements, the aforementioned patents do not disclose a new buoyant fishing apparatus. The inventive device includes a buoyant platform with an area for placing fishing accessories, a frame member coupled to the top surface, and a plurality of fishing rod holders.

In these respects, the buoyant fishing apparatus according to the present invention substantially departs from the conventional concepts and designs of the prior art, and in so doing provides an apparatus primarily developed for the purpose of supporting fishing rods and accessories above a water level.

SUMMARY OF THE INVENTION

In view of the foregoing disadvantages inherent in the known types of buoyant fishing apparatuses now present in the prior art, the present invention provides a new buoyant fishing apparatus construction wherein the same can be utilized for supporting fishing rods and accessories above a water level.

The general purpose of the present invention, which will be described subsequently in greater detail, is to provide a new buoyant fishing apparatus apparatus and method which has many of the advantages of the buoyant fishing apparatuses mentioned heretofore and many novel features that result in a new buoyant fishing apparatus which is not anticipated, rendered obvious, suggested, or even implied by any of the prior art buoyant fishing apparatuses, either alone or in any combination thereof.

To attain this, the present invention generally comprises a buoyant platform with an area for placing fishing accessories, a frame member coupled to the top surface, and a plurality of fishing rod holders.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new buoyant fishing apparatus apparatus and method which has many of the advantages of the buoyant fishing apparatuses mentioned heretofore and many novel features that result in a new buoyant fishing apparatus which is not anticipated, rendered obvious, suggested, or even implied by any of the prior art buoyant fishing apparatuses, either alone or in any combination thereof.

It is another object of the present invention to provide a new buoyant fishing apparatus which may be easily and efficiently manufactured and marketed.

It is a further object of the present invention to provide a new buoyant fishing apparatus which is of a durable and reliable construction.

An even further object of the present invention is to provide a new buoyant fishing apparatus which is susceptible of a low cost of manufacture with regard to both materials and labor, and which accordingly is then susceptible of low prices of sale to the consuming public, thereby making such buoyant fishing apparatus economically available to the buying public.

Still yet another object of the present invention is to provide a new buoyant fishing apparatus which provides in the apparatuses and methods of the prior art some of the advantages thereof, while simultaneously overcoming some of the disadvantages normally associated therewith.

Still another object of the present invention is to provide a new buoyant fishing apparatus for supporting fishing rods and accessories above a water level.

Yet another object of the present invention is to provide a new buoyant fishing apparatus which includes a buoyant platform with an area for placing fishing accessories, a frame member coupled to the top surface, and a plurality of fishing rod holders.

Still yet another object of the present invention is to provide a new buoyant fishing apparatus that allows a float tub and/or a wade angler to keep a wide array of fishing gear close at hand.

Even still another object of the present invention is to provide a new buoyant fishing apparatus that holds a plurality of fishing poles at an angle such that the rods can simply be stored, or put in use while inserted in the apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
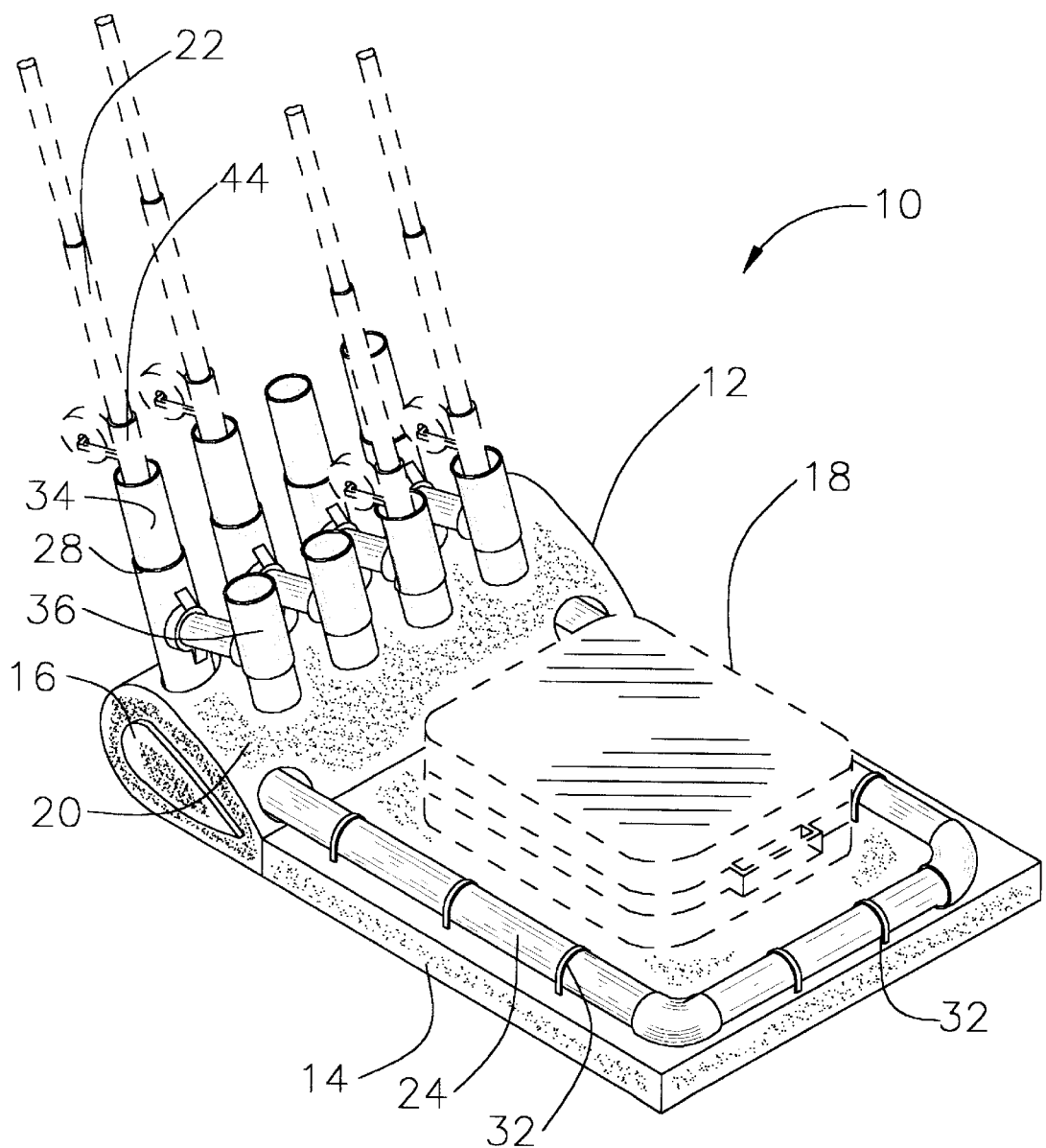
FIG. 1 is a perspective view of a new buoyant fishing apparatus according to the present invention.
Figure 2:
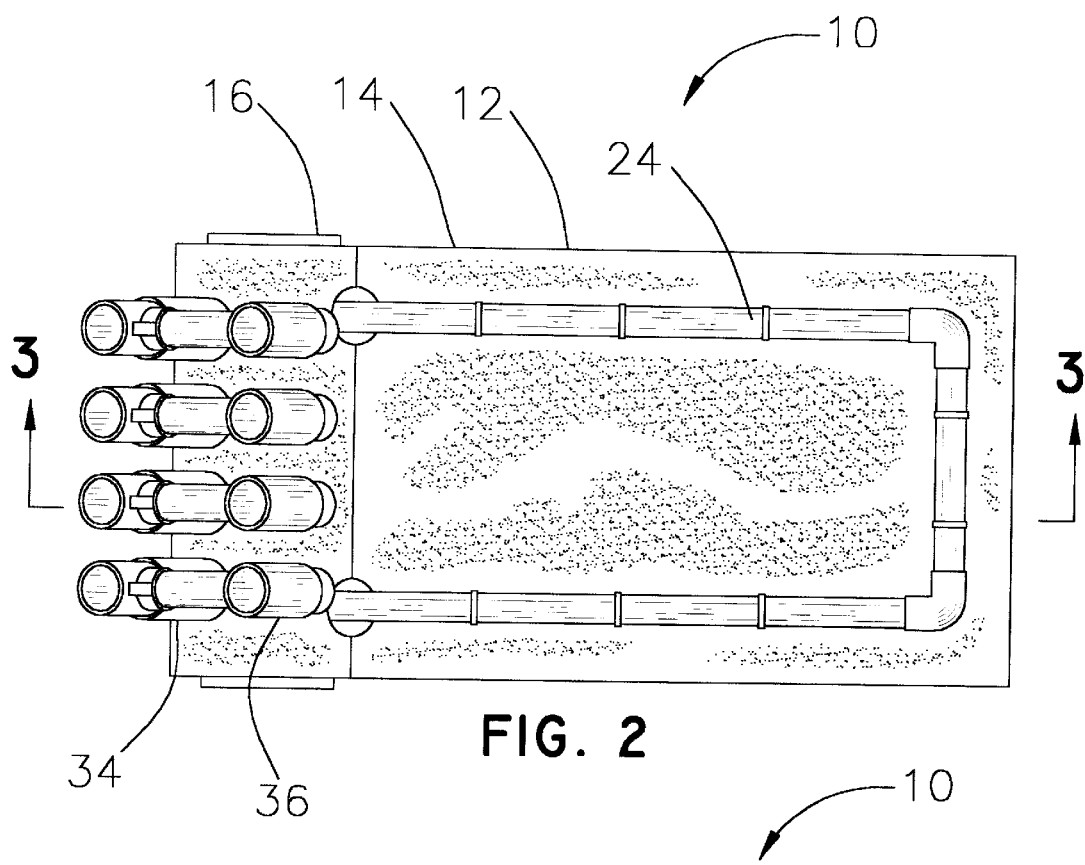
FIG. 2 is a top view of the present invention.
Figure 3:
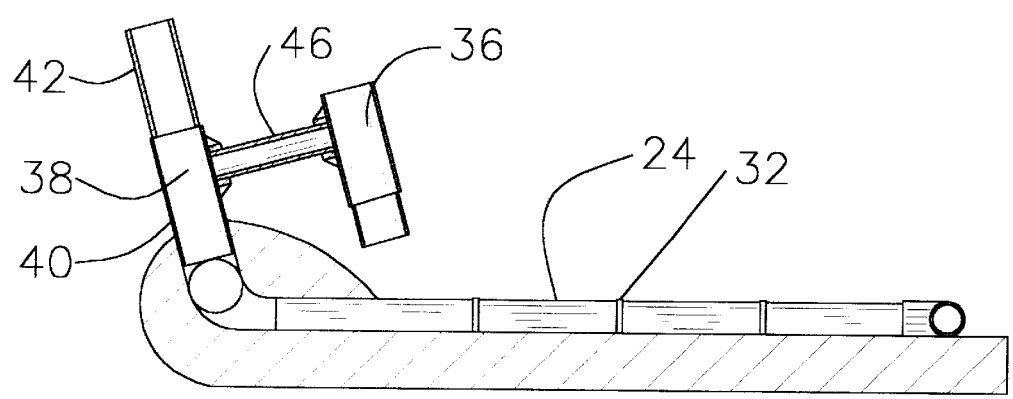
FIG. 3 is a side cross-sectional view of the present invention.

With reference now to the drawings, and in particular to FIGS. 1 through 3 thereof, a new buoyant fishing apparatus embodying the principles and concepts of the present invention and generally designated by the reference numeral 10 will be described.

As best illustrated in FIGS. 1 through 3, the buoyant fishing apparatus 10 generally comprises a buoyant platform 12 that is substantially rectangular in shape. The buoyant platform 12 comprises an accessory portion 14 and a rod holder portion 16.

The accessory portion 14 is substantially flat such that the accessory portion 14 is designed for placing fishing accessories 18 on.

The rod holder portion 16 has a raised section 20. The raised section 20 has a rather bulbous cross-section such that the raised section 20 of the rod holder portion 16 is designed for supporting the weight of a plurality of fishing rods 22.

A frame member 24 comprises lightweight tubular material. The frame member 24 is positioned on a top surface 26 of the accessory portion 14 of the buoyant platform 12 adjacent an outer perimeter of the accessory portion 14 continuing laterally into the rod holder portion 16 of the buoyant platform 12 such that the frame member 24 is substantially contiguous. The frame member 24 is designed for providing structural support to the buoyant platform 12 and also assuring that the fishing accessories 18 remain on the top surface 26 of the buoyant platform 12.

The frame member 24 includes a plurality of rod receptacle members 28. The rod receptacle members 28 are designed for holding fishing rods 22.

The buoyant platform 12 comprises a substantially buoyant material such that the buoyant platform 12 remains above the water level, therefore preventing a loss of any of the fishing accessories 18 or fishing rods 22 placed therewithin and on the buoyant platform 12.

A plurality of securing members 32 is designed for fixedly coupling the frame member 24 to the top surface 26 of the accessory portion 14 of the buoyant platform 12.

The rod receptacle members 28 are fixedly coupled to the frame member 24 inside the rod holder portion 16 of the buoyant platform 12. The rod receptacle members 28 are positioned in a vertical plane partially angled away from the accessory portion 14 of the buoyant platform 12 such that the fishing rods 22 are slanted away from the buoyant platform 12.

The rod receptacle members 28 comprise an outer rod holder and an inner rod holder 36. The outer rod holders 34 comprise a main tubular member 38 of a predetermined length. A lower end 40 of the main tubular member 38 is fixedly coupled to the frame member 24 such that the lower end 40 is substantially closed. An upper end 42 of the main tubular member 38 is substantially open such that the upper end 42 is designed for receiving handles 44 of the fishing rods 22.

The rod receptacles include a stem portion 46. The stem portions 46 are fixedly coupled to the main tubular members 38 of the outer rod holders 34 such that the stem portions 46 are substantially perpendicular to the stem members such that the inner rod holders 36 are substantially parallel to the outer rod holders 34. The inner rod holders 36 are designed for receiving the handles 44 of the fishing rods 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A buoyant fishing apparatus for supporting fishing rods and accessories above a water level, the buoyant fishing apparatus comprising:

a buoyant platform, said buoyant platform being substantially rectangular in shape, said buoyant platform comprising an accessory portion and a rod holder portion, said accessory portion being substantially flat such that said accessory portion being adapted for placing fishing accessories on;

said rod holder portion having a raised section, said raised section having a bulbous cross-section such that said raised section of said rod holder portion is adapted for supporting the weight of a plurality of fishing rods;

a frame member, said frame member comprising lightweight tubular material, said frame member being positioned on a top surface of said accessory portion of said buoyant platform adjacent an outer perimeter of said accessory portion continuing laterally into said rod holder portion of said buoyant platform such that said frame member being substantially contiguous, said frame member being adapted for providing structural support to said buoyant platform and also assuring that the fishing accessories remain on said top surface of said buoyant platform; and said frame member including a plurality of rod receptacle members, said rod receptacle members being adapted for holding fishing rods.

2. The buoyant fishing apparatus as set forth in claim 1, further comprising:

said buoyant platform comprising a substantially buoyant material such that said buoyant platform remains above the water level, therefore preventing a loss of any of the fishing accessories or rods placed therewithin and on said buoyant platform.

3. The buoyant fishing apparatus as set forth in claim 2, further comprising:

a plurality of securing members, said securing members being adapted for fixedly coupling said frame member to said top surface of said accessory portion of said buoyant platform.

4. The buoyant fishing apparatus as set forth in claim 3, further comprising:

said rod receptacle members being fixedly coupled to said frame member inside said rod holder portion of said buoyant platform, said rod receptacle members being positioned in a vertical plane partially angled away from said accessory portion of said buoyant platform such that the fishing rods are slanted away from said buoyant platform.

5. The buoyant fishing apparatus as set forth in claim 4, further comprising:

said rod receptacle members comprising an outer rod holder and an inner rod holder, said outer rod holders comprising a main tubular member of a predetermined length, a lower end of said main tubular member being fixedly coupled to said frame member such that said lower end being substantially closed, an upper end of said main tubular member being substantially open such that said upper end being adapted for receiving handles of the fishing rods; and said rod receptacles including a stem portion, said stem portions being fixedly coupled to said main tubular members of said outer rod holders such that said stem portions being substantially perpendicular to said stem members such that said inner rod holders being substantially parallel to said outer rod holders, said inner rod holders being adapted for receiving the handles of the fishing rods.

6. A buoyant fishing apparatus for supporting fishing rods and accessories above a water level, the buoyant fishing apparatus comprising:

a buoyant platform, said buoyant platform being substantially rectangular in shape, said buoyant platform comprising an accessory portion and a rod holder portion, said accessory portion being substantially flat such that said accessory portion being adapted for placing fishing accessories on;

said rod holder portion having a raised section, said raised section having a rather bulbous cross-section such that said raised section of said rod holder portion being adapted for supporting the weight of a plurality of fishing rods;

a frame member, said frame member comprising lightweight tubular material, said frame member being positioned on a top surface of said accessory portion of said buoyant platform adjacent an outer perimeter of said accessory portion continuing laterally into said rod holder portion of said buoyant platform such that said frame member being substantially contiguous, said frame member being adapted for providing structural support to said buoyant platform and also assuring that the fishing accessories remain on said top surface of said buoyant platform;

said frame member including a plurality of rod receptacle members, said rod receptacle members being adapted for holding fishing rods;

said buoyant platform comprising a substantially buoyant material such that said buoyant platform remains above the water level, therefore preventing a loss of any of the fishing accessories or rods placed therewithin and on said buoyant platform;

a plurality of securing members, said securing members being adapted for fixedly coupling said frame member to said top surface of said accessory portion of said buoyant platform;

said rod receptacle members being fixedly coupled to said frame member inside said rod holder portion of said buoyant platform, said rod receptacle members being positioned in a vertical plane partially angled away from said accessory portion of said buoyant platform such that the fishing rods are slanted away from said buoyant platform;

said rod receptacle members comprising an outer rod holder and an inner rod holder, said outer rod holders comprising a main tubular member of a predetermined length, a lower end of said main tubular member being fixedly coupled to said frame member such that said lower end being substantially closed, an upper end of said main tubular member being substantially open such that said upper end being adapted for receiving handles of the fishing rods;

said rod receptacles including a stem portion, said stem portions being fixedly coupled to said main tubular members of said outer rod holders such that said stem portions being substantially perpendicular to said stem members such that said inner rod holders being substantially parallel to said outer rod holders, said inner rod holders being adapted for receiving the handles of the fishing rods.

\* \* \* \* \*